United States Patent
Seccombe

(12) 
(10) Patent No.: US 6,250,041 B1
(45) Date of Patent: Jun. 26, 2001

(54) HOLD DOWN BRACKET

(75) Inventor: Campbell John Seccombe, Turramurra (AU)

(73) Assignee: BHP Steel (JLA) Pty Ltd., Melbourne (AU)

( * ) Notice: Subject to any disclaimer, the term of this patent is extended or adjusted under 35 U.S.C. 154(b) by 0 days.

(21) Appl. No.: 09/152,257

(22) Filed: Sep. 14, 1998

(30) Foreign Application Priority Data

Sep. 15, 1997 (AU) .................................................. PO 9199

(51) Int. Cl.⁷ ........................................................ E04C 5/00
(52) U.S. Cl. ............................ 52/712; 52/293.3; 52/289; 52/702; 403/190; 403/232.1
(58) Field of Search ................... 52/712, 167.1, 52/506.05, 506.07, 293.3, 702, 289; 248/205.1, 205.4, 220.42, 228.1; 403/190, 232.1

(56) References Cited

U.S. PATENT DOCUMENTS

| | | | |
|---|---|---|---|
| 4,665,672 | * 5/1987 | Commins et al. | 52/295 |
| 4,920,713 | * 5/1990 | Borresen et al. | 52/200 |
| 4,932,173 | * 6/1990 | Commins | 52/92.2 |
| 5,230,198 | * 7/1993 | Callies | 52/702 |
| 5,457,928 | * 10/1995 | Sahnazarian | 52/702 |
| 5,467,570 | * 11/1995 | Leek | 52/712 |
| 5,519,977 | * 5/1996 | Callahan et al. | 52/712 |
| 5,572,844 | * 11/1996 | Stackenwalt et al. | 52/506.07 |
| 5,598,680 | * 2/1997 | Wilhelmi | 52/715 |
| 5,653,079 | * 8/1997 | Loeffler et al. | 52/712 |
| 5,664,392 | * 9/1997 | Mucha | 52/715 |
| 5,678,379 | * 10/1997 | Quattrociocchi | 52/712 |
| 5,794,395 | * 8/1998 | Reed | 52/298 |
| 5,810,303 | * 9/1998 | Bourassa et al. | 248/205.1 |
| 5,836,131 | * 11/1998 | Viola et al. | 52/702 |
| 5,846,018 | * 12/1998 | Frobosilo et al. | 403/403 |
| 5,857,295 | * 1/1999 | Mikawa | 52/92.2 |
| 5,857,306 | * 1/1999 | Pellock | 52/643 |
| 5,885,024 | * 3/1999 | Zupan et al. | 403/389 |
| 5,904,023 | * 5/1999 | diGirolamo et al. | 52/712 |
| 5,924,246 | * 7/1999 | Jurgens et al. | 52/39 |
| 5,979,130 | * 11/1999 | Gregg et al. | 52/295 |

FOREIGN PATENT DOCUMENTS

| | | |
|---|---|---|
| 56498/94 | 9/1994 | (AU) . |
| 3729824 | 3/1989 | (DE) . |
| WO 90/12938 | 11/1990 | (WO) . |

OTHER PUBLICATIONS

Derwent Abstract Accession No. 97–116164/11, Class Q43, JP 9–004101 (Misana Homes Co Ltd) Jan. 7, 1997.

* cited by examiner

Primary Examiner—Christopher T. Kent
Assistant Examiner—Jennifer I. Thissell
(74) Attorney, Agent, or Firm—Miles & Stockbridge P.C.; John C. Kerins

(57) ABSTRACT

The present invention relates generally to a bracket (1) which in a preferred embodiment is formed of a single strip of sheet metal comprising an affixture portion or a flat wall frame affixture portion (2) and an anchoring portion or a flat base affixture portion (3) having temporary spacing means in the form of four outwardly protruding teeth (4) projecting from a lower face of the base affixture portion (3). The wall frame affixture portion (2) is secured via affixture fasteners (7) to a structural member of a wall frame in the form of a wall stud (8). The base of affixture portion (3) is secured against the upper surface of a building element or a concrete floor slab (6). In assembly, the teeth (4) provide a temporary gap between the lower face (13) of the base fixture portion (3) and the upper surface of the base or concrete floor slab (6). The bracket (1) is secured to the concrete slab (6) via a bolt or shank (9) pre-anchored to the base (6). A nut (13) is threaded onto the shank (9) whereby tightening of the nut (13) crushes the teeth (4) and tensions the stud (8) via the bracket (1).

20 Claims, 3 Drawing Sheets

HOLD DOWN BRACKET

FIELD OF THE INVENTION

This invention relates to building construction and more particularly to bracing brackets used to secure building members to one another during the erection of light duty metal frame buildings. The invention was devised primarily for use to brace metal wall frames to bases and has particular but not exclusive application to the bracing of light duty metal wall frames to concrete floors. However, it may also be applied to form prestressed joints between any two building members.

BACKGROUND TO THE INVENTION

Traditional light duty steel wall frames of the kind used in the walls of single storey houses, sheds and other relatively small buildings are generally made from structural members that are roll formed from light gauge sheet metal and comprise a plurality of spaced apart vertical studs, a horizontal top plate affixed to the upper end of the studs, a horizontal bottom plate affixed to the lower end of the studs and bracing straps or noggings affixed to and traversing the studs.

It has been proposed to secure together the base and well frame by a simple angle shaped steel metal bracket, having a horizontal flange fastened to the top face of the base anchored by bolts and a vertical flange fastened to the side of the end portion of the wall stud of the metal frame. Wall frames are designed to bear the weight of the roof truss and the roof covering on the basis that loads will be transferred to the load support members at or near the ends of the wall studs. Customarily, when conventional angle brackets are used to secure the wall studs to the base, undesirable reaction loads and torsional stresses are imposed on the end portions of the wall studs and/or the base anchor bolts at the position of the bracket. When extraneous forces are applied to the structure by means of for example, earthquake, the loads and stresses at these joints are even more pronounced.

In areas subject to earthquake and other extraneous load imposing natural phenomena, high capacity bracing panels have been proposed to resist such loads. These generally comprise a metal wall frame of the above kind clad with sheeting formed of, for example, metal such as for example steel, or wood such as for example plywood.

These bracing panels are generally anchored to concrete footings, floor slabs or other building components by affixture of the bottom plate thereto.

However under earthquake loads, it has been found that anchoring of this kind generally offers insufficient rigidity and strength to prevent damage to the wall and building structure.

A basic requirement of a bracing system to resist earthquake loads is for ultimate strength and resistance to deflection (stiffness). Steel wall frames can fairly easily be designed for strength but it has be proven difficult to design adequate stiffness into light gauge steel wall frames. This is because light gauge steel wall frame members readily exhibit small deflections around fasteners and across the members.

Earthquake forces generally come from horizontal shaking of the roof structure and enter the bracing panel horizontally through the top plate.

These horizontal forces at the top of the panel are resisted by vertical forces holding the bracing panel to the concrete slab or other parts of the structure.

Generally a bracing panel is held down by providing a fixing through the bottom plate, sometimes reinforcing the stud to plate connection with a strap, but all these systems ail the deflection criteria because of local bending between elements.

SUMMARY OF THE INVENTION

According to a first aspect of the present invention there is provided a bracket for connecting an end portion of a structural member to a building element, the bracket comprising:

an affixture portion adapted to be connected to the structural member;

an anchoring portion connected to the affixture portion and adapted to be anchored to the building element; and spacer means being adapted to operatively cooperate with the anchoring portion and the building element so that a face of the anchoring portion is temporarily spaced a predetermined distance from the building element and thereafter movement of the spacer means relative to the anchoring portion and securing of the bracket to the building element effects tensioning of the structural member.

Generally the structural member is oriented upright and the building element provides a load bearing base. Preferably the load bearing base is rigid and the structural member is tensionable. In one embodiment the structural member is a metal stud constructed of a relatively light gauge material. In one example the metal stud is formed of a material having a wall thickness of less than about 1 mm.

It is preferred that the spacer means is integral with the anchoring portion to enable the spacer means to be moved from between the anchoring portion and the building element as a result of securing the anchoring portion to the building element.

Preferably the spacer means comprises crushable elements formed in the face of the anchoring portion, the crushable elements adapted to collapse and the face of the anchoring portion to contact the building element upon securing to the building element. Thus, a predetermined amount of tension is provided in the joint formed by the bracket.

It is also preferred that the bracket is formed of a single strip of sheet metal and wherein both the affixture portion and the anchoring portion present a substantially flat face to the structural member and the building element, respectively, the affixture and anchoring portions each defining planes intersecting at right angles, and the spacer means being in the form of a plurality of outwardly protruding teeth projecting from the face of the anchoring portion.

Preferably the affixture portion is at least three times the length of the anchoring portion. Preferably the affixture portion has a thickness of from between two to three times that of the wall thickness of the structural member. This provides a bracket with the affixture portion having the necessary resilience for tensioning of the structural member.

Preferably the anchoring portion is provided with one or more holes each designed to receive an anchoring fastener for securing of the bracket to the building element.

Preferably the affixture portion includes a series of apertures each designed to receive an affixture fastener for connection of the bracket to the structural member. More preferably the affixture portion is elongate and the apertures are arranged as two transversely spaced arrays of apertures. In particular the arrays are parallel and the apertures of each array are offset longitudinally so as to minimise any reduction in the cross-sectional area of the affixture portion of the bracket. Generally in each array the longitudinal spacing between adjacent apertures increases in a direction toward the anchoring portion of the bracket.

Preferably the aperture(s) nearest the anchoring portion are positioned from the junction of the anchoring and affixture portions a distance of at least two times the width of the affixture portion. This allows the bracket to flex under lateral movement of the structural member.

More preferably the anchoring portion is provided with a terminal end flange which extends substantially parallel to and in the same direction as the affixture portion.

It is preferred that the bracket further comprises a stiffening member located on an opposing face of the anchoring portion so as to distribute the force applied through the anchoring portion in securing the bracket to the building element. Generally the stiffening member has a lower profile shape substantially corresponding to an upper surface of the anchoring portion.

Preferably an inner radius of the bracket defined by the adjoining affixture and anchoring portions is shaped complementary to an abutting radius of the stiffening member, both of said radii being relatively large so as to reduce stress concentration when the bracket and structural member are tensioned. It is preferable for the stiffening member to be fixed to the anchoring portion of the bracket, for example by paddle or spot welding of the stiffening member to the anchoring portion distant from where it adjoins the affixture portion thereby avoiding softening of the bracket is areas of load.

In some embodiments a frame bottom plate may be interposed between the anchoring portion of the bracket and the building element.

It is preferable for the bracket itself to be inexpensive and as readily applied on site as are conventional brackets. To those ends, a preferred embodiment of the invention comprises a metal bracket comprising of a wall frame affixture portion to be fastened to the end portions of a wall stud of a wall frame, a base affixture portion adapted to be fastened to an upper surface of a base such as a concrete floor and temporary spacer means extending between the base affixture portion and the base to provide a gap of predetermined thickness therebetween, the spacer means being integral with the base affixture portion to enable the spacer means to be moved from between the base affixture portion and the base as a result of affixture of the base affixture portion to the base.

The invention also provides for holding a bracing panel to a base in the form of, for example, a concrete slab directly from the studs by means of a bracket fitted to a stud at each end of the panel. The bracket is fixed to each stud by screws or other fastener means in such a way that the other end of the bracket to held off the bottom plate end of the respective stud by a predetermined distance, such as, for example, 2 mm. The hold down bracket is tightened down by the hold down bolt or bolts so that the bracket pretensions the joint and removes substantially all the small gaps and spaces in the hold down connection. As a result the joint is substantially stiffened and higher bracing loads can be achieved.

To easily space the bracket assembly above the base while it is being fixed to the stud it is proposed to provide spacer means in the form of small crushable elements formed in the bottom face of the bracket during its manufacture that will collapse when the hold down nut is screwed down along the shank of the hold down bolt thereby providing the predetermined amount of pretension in the joint.

The invention also provides in combination, a wall frame, a base below and extending across the wall frame, and a bracket according to the invention extending from the base to the frame.

According to a second aspect of the present invention there is provided a joint between an end portion of a structural member and a building element, the joint comprising:

a bracket including an affixture portion connected to the end portion of the structural member, and an anchoring portion connected to the affixture portion and anchored to the building element; and spacer means operatively cooperating with the anchoring portion and the building element so that a face of the anchoring portion is temporarily spaced a predetermined distance from the building element and thereafter movement of the spacer means relative to the anchoring portion and securing of the bracket to the building element affects tensioning of the structural member.

According to a third aspect of the present invention there is provided a method of securing an end portion of a structural member to a building element, said method comprising the steps of:

providing a bracket including an affixture portion connected to the end portion of the structural member, an anchoring portion connected to the affixture portion and adapted to be anchored to the building element, and spacer means operatively cooperating with the anchoring portion and the building element;

temporarily spacing a face of the anchoring portion a predetermined distance from the building element via the spacer means located between the face and the building element; and moving the spacer means relative to the anchoring portion and securing the bracket to the building element thereby tensioning the structural member.

According to a fourth aspect of the present invention there is provided a bracket for connecting an end portion of a structural member to a building element, the bracket comprising:

an affixture portion adapted to be connected to the structural member; and an anchoring portion connected to the affixture portion and adapted to be anchored to the building element, the affixture portion being elongate and including at least two transversely spaced arrays of apertures wherein the apertures of one array are longitudinally offset from those of the adjacent array each aperture being designed to receive an affixture fastener for fixing of the bracket to the structural member.

Preferably the arrays are parallel and the apertures of each array are offset longitudinally so as to minimise any reduction in the cross-sectional area of the affixture portion of the bracket. More preferably the longitudinal spacing between adjacent apertures in each array increases in a direction toward the anchoring portion of the bracket.

According to a fifth aspect of the present invention there is provided a bracket for connecting an end portion of a structural member to a building element, the bracket comprising:

an affixture portion adapted to be connected to the structural member; and an anchoring portion connected to the affixture portion and adapted to be anchored to the building element, the affixture portion being constructed of a resiliently flexible material and configured to permit elastic deformation during securing of the bracket of the building element whereby the structural member is tensioned.

Preferably the affixture portion is formed of an elongate strap including at least two transversely spaced arrays of apertures wherein the apertures of one array are longitudinally offset from those of the adjacent array each aperture being designed to receive an affixture fastener and arranged so that the tension force applied through the bracket is distributed between the affixture fasteners.

According to a sixth aspect of the present invention there is provided a bracket for connecting an end portion of a structural member to a building element, the bracket comprising:

an affixture portion adapted to be connected to the structural member; and an anchoring portion connected to the affixture portion and adapted to be anchored to the building element, the affixture portion being connected to the anchoring portion whereby bending moments induced between the affixture portion and the anchoring portion are minimised during securing of the bracket to the building element and tensioning of the structural member.

Preferably the affixture and anchoring portions are formed integral with each other and define planes intersecting at right angles, the anchoring portion including a hole designed to receive an anchoring fastener for securing of the bracket to the building element, the hole disposed closely alongside a plane of the affixture portion so as to reduce bending moments generated between the affixture and anchoring portions during securing of the bracket to the building element. In one embodiment the anchoring fastener for securing the bracket to the building element is angularly biased relative to the affixture portion so that an outer surface of the anchoring portion bears on the building element. This may be achieved by angularly biasing the hole provided in the anchoring portion and/or the stiffening member. Alternatively a face of the stiffening member may be perpendicularly offset from the hole so as to bias the anchoring fastener.

BRIEF DESCRIPTION OF THE DRAWINGS

By way of example, one embodiment of the above described invention is described in more detail hereinafter with reference to the accompanying drawings in which.

DETAILED DESCRIPTION OF THE PREFERRED EMBODIMENT

Figure 1:
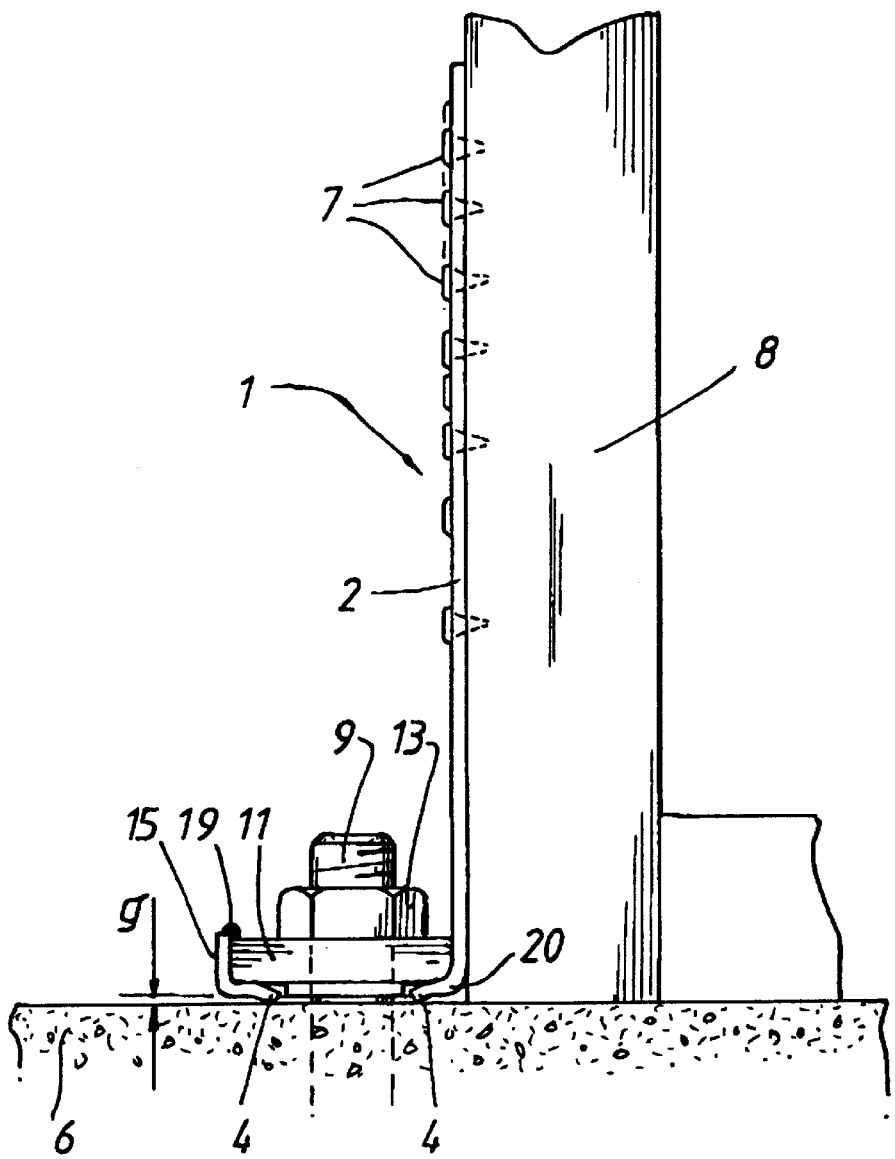
FIG. 1 is side elevation of a connection using a bracket according to one embodiment of the invention.
Figure 2:
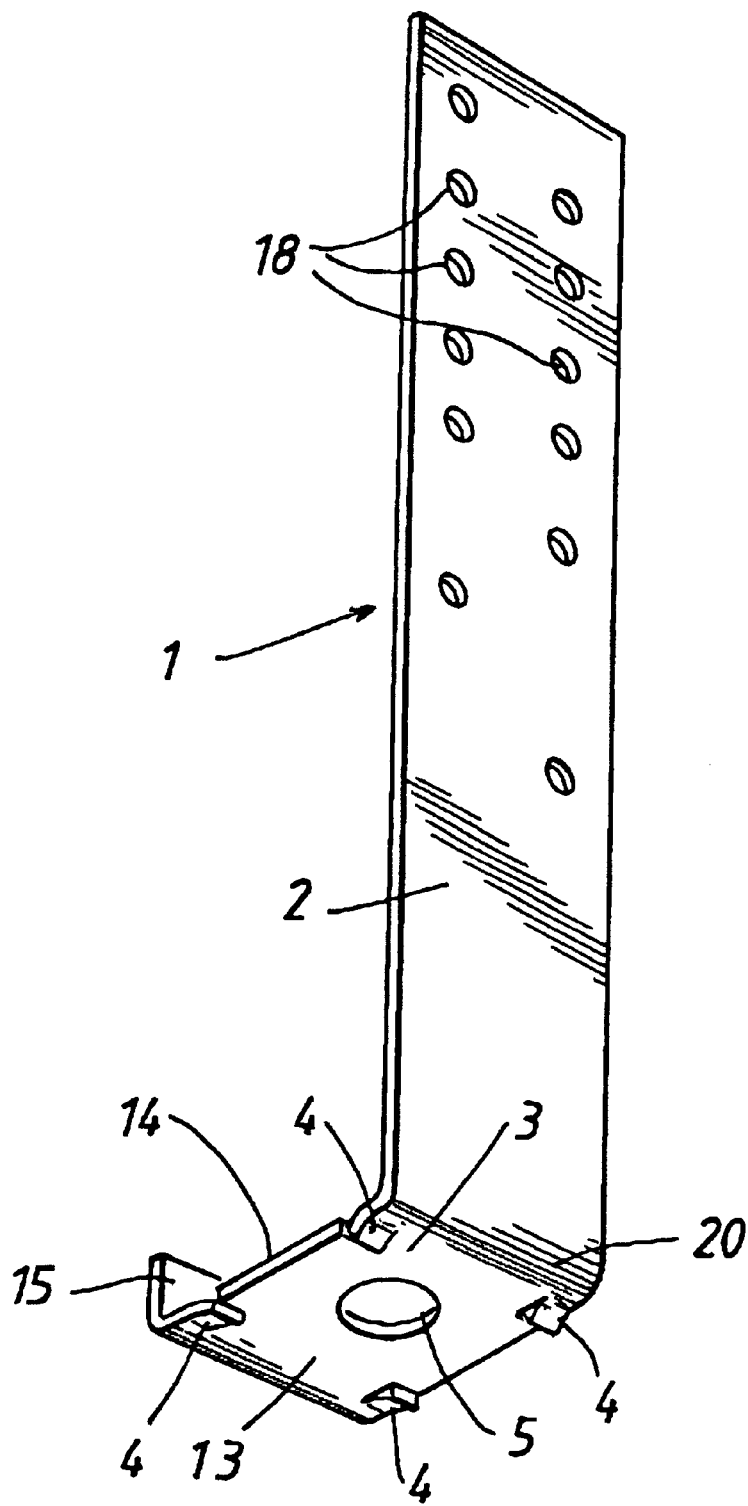
FIG. 2 is an inverted perspective view of the bracket of FIG. 1.
Figure 3:
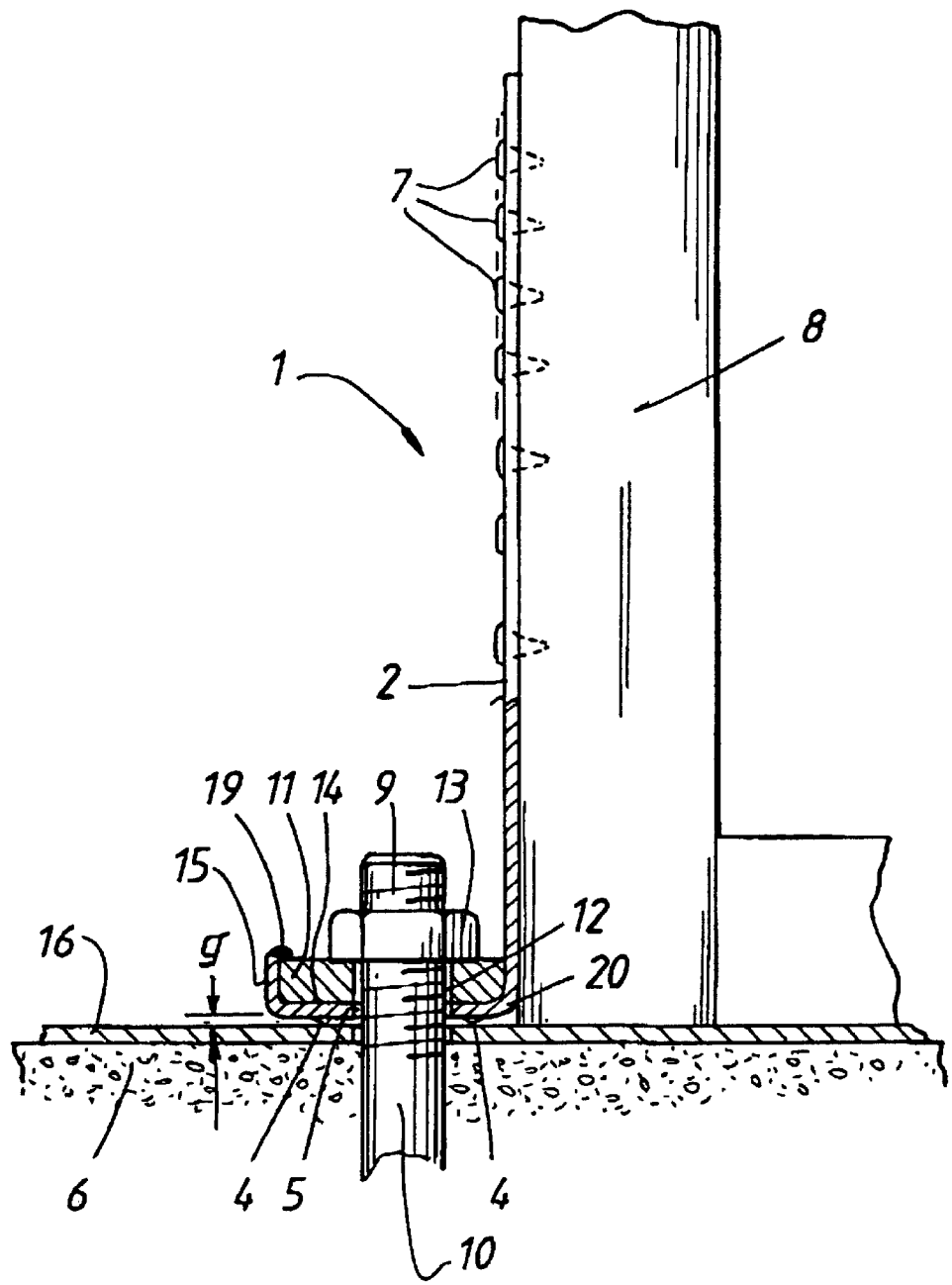
FIG. 3 is a side elevation of another connection using the bracket of FIG. 1.

The bracket 1 illustrated by FIGS. 1, 2 and 3 is formed of a single strip of sheet metal, preferably galvanised steel, and comprises an affixture portion of a flat wall frame affixture portion 2 and an anchoring portion or a flat base affixture portion 3 having temporary spacing means in the form of four outwardly protruding teeth 4 projecting from a lower face of the base affixture portion 3.

The wall frame affixture portion 2 is adapted by means of affixture fasteners 7 to be secured flatly against a side surface of an end portion of a structural member of a wall frame in the form of a wall stud 8. The wall stud 8 which for clarity is shown as a square-section is ordinarily an elongate channel section having a web and side flanges. The web may be provided with a recess being shaped to receive the affixture portion 3 of the bracket 1. In other embodiments, the studs 8 maybe of more elaborate cross-sectional profiles such as, for example, C-section profiles in which each side flange is provided with a stiffening lip extending along its free edge so that the lips project towards one another. The base affixture portion 3 is adapted by means of an anchoring hole 5 to be secured against the upper surface of a building element or a base 6 such as, for example, a concrete floor slab or a foundation. The bracket 1 is designated to provide a relatively stiff, high load capacity connection between the wall stud 8 or bracing panel and the base 6 or the ground/lower storey.

In assembly, the teeth 4 provide a temporary gap of predetermined thickness (g) between the lower face 13 of the base affixture portion 3 of the bracket 1 and the upper surface of the base 6. In assembly, the wall frame affixture portion 2 of the bracket 1 is affixed to the web of the stud 8 by means of screws, bolts or other fastener means 7 wherein the end of the wall stud 8 is slightly raised from the plane defined by the ends of the teeth 4.

The stud 8 with the bracket 1 affixed thereto is then stood upright upon the base 6 with the fastener anchoring hole 5 of the base affixture portion 3 emplaced over and in register with the shank 9 of an anchor bolt 10 which has been pre anchored to the base 6 in the form of a concrete slab at its predetermined position. The stud 8 affixed bracket 1 is then permitted to fall downward to enable the shank 9 of the anchor bolt 10 to be threaded through the fastener hole 5 of the base affixture portion 3. The stud 8 affixed bracket 1 thereby sits on the base 6 with base affixture portion 3 spaced apart from the base 6 by a predetermined distance (g) being the height of the teeth 4 projecting from the lower face 13 of the base affixture portion 3. The height of the teeth (g) may typically be in the range of one to four millimeters and preferably about two millimeters for single storey wall panels.

A block 11 of rectangular cross-section, having an offset clearance hole 12 is located, in this example puddle or spot welded 19, over the base affixture portion 3 and an anchor bolt nut 13 is threaded onto the shank 9 of the anchor bolt 10. The block 11 is sized to cover the toothed area of the base affixture portion 3 so that axial forces applied by screw tightening the nut 13 on the shank 9 are transferred directly to the teeth 4 which, as a result of said tightening, deflect back into the recesses in the base affixture portion 3 from which they were cut and/or pressed, thereby enabling the lower face 13 of the base affixture portion 3 to make contact with the base 6. As a result, the lower end portion of the wall stud 8 is pressed tightly against the base 6, thereby pre-stressing the joint between the wall stud 8 and the base 6. The clearance hole 12 is biased so that an outer face of the block 11 bears down on the anchoring portion 3 whilst the affixture portion 2 is tensioned upward.

The block 11 is also shaped and sized so as to apply the load substantially evenly across an upper face 14 of the base affixture portion 3, and particularly shaped and sized to be a neat fit between the substantially upright wall affixture portion 2 and the upright flange 15 at a terminal end of the base affixture portion 3. The upright flange 15 extends substantially parallel to and in the same direction as the wall affixture portion 2. The base affixture portion 3 and the wall affixture portion 2 extend in planes intersecting substantially at right angles to one another.

The wall affixture portion 2 of the bracket 1 of this embodiment is approximately four times the length of the base affixture portion 3. The bracket 1 is designed for securing and pretensioning metal wall studs 8 of a relatively light gauge material, usually of less than 1 mm wall thickness. Accordingly the bracket 1 is of a thickness which should not exceed six times the wall thickness of the stud 8 and preferably should be two to three times the stud 8 wall thickness. This provides the necessary resilience in connection of the bracket 1 to the stud 8 and the base 6 for pretensioning of the stud 8.

The illustrated embodiment may be made by placing sheet steel strip through a repetitive punching machine which punches the clearance hole 5 and teeth 4 at appropriate positions. That pre punched strip may then pass to a press where the strip is folded to form the flange 15 and the fold line between the base affixture portion 3 and the wall frame affixture portion 2 and the strip is cropped to length to form the finished bracket 1. Each tools 4 is punched from the material of the strip to leave a corresponding hole therein.

FIG. 1 illustrates a bracket 1 affixed to the lower end portion of an upright wall stud 6 of a bracing panel.

FIGS. 1 and 3 each illustrate a bracket 1 affixed to a wall stud 8 of a bracing panel immediately prior to effecting the affixture. That is to say, immediately prior to the nut 13 being screw tightened on the shank 9 to effect affixture of the joint.

FIG. 3 illustrates a joint similar to that illustrated by FIG. 1 except that a bottom plate 16 is interposed between the base affixture portion 3 of the bracket 1 and the base 6 so that the ends of the teeth 4 sit on the upper face of the bottom plate 16 instead of the upper face of the base 6 prior to affixture. The same numerals are used to identify the same components in both FIGS. 1 and 3.

The steel strip of the wall affixture portion 2 is relatively long and designed so that the affixture fasteners 7 share the load in transferring the tension force from the bracket 1 to the stud 8. The steel strip may elastically deform between adjacent affixture fasteners 7 so as to effectively distribute the load. The arrangement of longitudinally spaced fasteners 7 along the affixture portion permits fixing of the bracket 1 to relatively light gauge studs 8. Further, the fastener anchoring hole 5 is located closely alongside a plane defined by the wall affixture portion 2 so as to reduce bending moments induced between the wall and base affixture portions 2 and 3 during securing of the bracket 1 and tensioning of the stud 8.

The base affixture portion 3 where it adjoins the wall affixture portion 2 has a relatively large radius 20 which together with a corresponding radius in the stiffening member or washing 11 reduces stress concentrations in the bracket 1. The bracket 1 is configured so that the forces/loads therein are predominantly tension forces as opposed to bending forces.

The bracket 1 is fixed to the stud 8 via a relatively large number of affixture fasteners on screws 7 as dictated by the relatively this wall ed stud 8. The wall affixture portion 2 includes apertures 18 for each of the screws 7, these apertures 18 being formed in two transversely spaced arrays of longitudinally offset apertures 18 each designed to receive the fastener 7 for fixing the bracket 1 to the stud 8. It is understood that the affixture portion 2 will yield where the cross-section is least and the load is highest. The bracket 1 is thus designed so that the load will reduce over the length of the screw 7 pattern with the lowermost screw 7 experiencing substantially all the load and the uppermost screw experiencing a fraction of the load. For example, with twelve screws the uppermost screw may experience approximately $1/12$ of the load. The screws 7 are longitudinally offset with the lowermost screws 7 being spaced further apart than uppermost screws 7. Thus, the net cross-sectional area across the wall affixture portion 2 at the lowermost screw is smaller than any other cross-section. Further, the offset configuration of the apertures provides several alternate possible fracture zones rather than weakening of the bracket at a single cross-section alone.

It would be appreciated that modification to the invention can be readily made without departing from the spirit and scope of the invention. For example, the building element may be in the form of a metal building member such as, for example, a metal structural member and a joint using a bracket according to the invention may be formed between building members disposed remote from a concrete floor.

The claims defining the invention are as follows:

1. A bracket for connecting an end portion of a structural member to a building element, the bracket comprising:
   an affixture portion adapted to be connected to the structural member;
   an anchoring portion connected to the affixture portion and adapted to be anchored to the building element; and
   spacer means operatively cooperating with the anchoring portion so that a face of the anchoring portion is temporarily spaced a predetermined distance from the building element and thereafter movement of the spacer means relative to the anchoring portion and securing of the bracket to the building element effects tensioning of the structural member, and wherein the spacer means is in the form of a plurality of outwardly protruding teeth projecting from the face of the anchoring portion.

2. A bracket according to claim 1 wherein said spacer means is integral with the anchoring portion to enable the spacer means to be moved from between the anchoring portion and the building element as a result of securing the anchoring portion to the building element.

3. A bracket according to claim 1 wherein the spacer means comprises crushable elements formed in the face of the anchoring portion, the crushable elements adapted to collapse and the face of the anchoring portion to contact the building element upon securing to the building element.

4. A bracket according to claim 1 wherein the bracket to formed of a single strip of sheet metal and wherein both the affixture portion and the anchoring portion present a substantially flat face to the structural member and the building member, respectively, the affixture and anchoring portions each defining planes intersecting at right angles.

5. A bracket according to claim 1 wherein the affixture portion is formed of an elongate strap including at least two transversely spaced arrays of apertures wherein the apertures of one array are longitudinally offset from those of the adjacent array each aperture being designed to receive an affixture fastener and arranged so that the tension force applied through the bracket is distributed between the affixture fasteners.

6. A bracket according to claim 5 wherein the affixture apertures are arranged as two longitudinal arrays of substantially parallel spaced apart apertures.

7. A bracket according to claim 1 wherein the affixture portion is at least three times the length of the anchoring portion.

8. A bracket according to claim 1 wherein the anchoring portion is provided with one or more holes each designed to receive a fastener for securing of the bracket to the building element.

9. A bracket according to claim 1 wherein the anchoring portion is provided with a terminal end flange which extends substantially parallel to and in the same direction as the affixture portion.

10. A bracket according to claim 1 further comprising a stiffening member located on an opposing face of the anchoring portion so as to distribute the force applied through the anchoring portion in securing the bracket to the building element.

11. A bracket according to claim 1 further comprising a frame bottom plate positioned at a lower surface of the anchoring portion of the bracket and adapted to be interposed between the anchoring portion and the building element, once the anchoring portion is anchored to the building element.

12. A bracket for connecting an end portion of a structural member to a building element, the bracket comprising:

a resiliently flexible affixture portion adapted to be connected to the structural member, said affixture portion being a substantially flat, planar element;

an anchoring portion connected to the affixture portion and adapted to be anchored to the building element, the affixture portion being configured to permit elastic deformation during securing of the bracket to the building element whereby the structural member is tensioned upon securement of said bracket to the building element, and the affixture portion being coupled to said anchoring portion in a manner to permit the affixture portion to flex at least along substantially a free length thereof extending between its connection to the anchoring portion and its connection to the structural member thereby permitting the structural member to move laterally with respect to the building element, once the bracket is secured to the structural member and the building element.

13. A bracket according to claim 12 wherein the affixture portion is formed of an elongate strap including at least two transversely spaced arrays of apertures wherein the apertures of one array are longitudinally offset from those of the adjacent array each aperture being designed to receive an affixture fastener and arranged so that the tension force applied through the bracket is distributed between the structure fasteners.

14. A bracket according to claim 13 wherein the affixture aperture are arranged as two longitudinal arrays of substantially parallel spaced apart apertures.

15. A bracket according to claim 14 wherein the affixture apertures of each of the arrays are offset longitudinally so as to minimise any reduction in the cross-sectional area of the affixture portion of the bracket, and the spacing between adjacent apertures increase in a direction toward the anchoring portion.

16. A bracket for connecting an end portion of a structural member to a building element, the bracket comprising:

a resiliently flexible affixture portion adapted to be connected to the structural member;

an anchoring portion connected to the affixture portion and adapted to be anchored to the building element, the affixture portion being configured to permit elastic deformation during securing of the bracket to the building element, whereby the structural member is tensioned upon completion of said securing of the bracket to the building element; the affixture portion comprising an elongate strap including at least two transversely spaced arrays of apertures, wherein the apertures of one array are longitudinally offset from those of the adjacent array; and wherein the affixture apertures nearest the anchoring portion are positioned from the junction of the affixture and anchoring portions a distance of at least two times the width of the affixture portion thereby permitting the bracket to flex under lateral movement of the structural member.

17. A bracket for connecting an end portion of a structural member to a building element, the bracket comprising:

a resiliently flexible affixture portion adapted to be connected to the structural member, said affixture portion being a substantially flat, planar element an anchoring portion connected to the affixture portion and adapted to be anchored to the building element, the affixture portion being connected to the anchoring portion whereby bending moments induced between the affixture portion and the anchoring portion are minimized during securing of the bracket to the building element and tensioning of the structural member, the anchoring portion having a mounting bore extending therethrough; and a stiffening member disposed on and secured to an upper surface of the anchoring portion and having a bore therethrough in alignment with the mounting bore of said anchoring portion, so as to reinforce the anchoring portion to distribute the force applied through the anchoring portion in securing the bracket to the building element.

18. The bracket according to claim 17 wherein the affixture and anchoring portions are formed integral with each other and define planes intersecting of right angles, the anchoring portion including an anchoring hole designed to receive an anchoring fastener for securing of the bracket to the building element, the anchoring hole disposed closely alongside a plane of the affixture portion so as to reduce the bending moments generated between the affixture and anchoring portions during securing of the bracket to the element.

19. A bracket according to claim 17 wherein the stiffening member has a lower profile shape substantially corresponding to an upper surface of the anchoring portion, an inner radius of the bracket defined by the adjoining affixture and anchoring portions being shaped complementary to an abutting radius of the stiffening member, both of said radii being relatively large so as to reduce stress concentration when the bracket and structural member are tensioned.

20. A bracket according to claim 18 wherein the stiffening member is fixed to the anchoring portion of the bracket.

* * * * *

UNITED STATES PATENT AND TRADEMARK OFFICE
CERTIFICATE OF CORRECTION

PATENT NO.    : 6,250,041 B1
DATED         : June 26, 2001
INVENTOR(S)   : Campbell John Seccombe It is certified that error appears in the above-identified patent and that said Letters Patent is hereby corrected as shown below:

Column 8,
Line 40, "to" (second occurrence) is changed to -- is --.
Line 41, "aperture" is changed to -- apertures --.

Column 9,
Line 47, "increase" is changed to -- increases --.

Column 10,
Line 37, "of" is change to -- at --.

Signed and Sealed this

Eighteenth Day of June, 2002

*Attest:*

*Attesting Officer*

JAMES E. ROGAN
*Director of the United States Patent and Trademark Office*